Dec. 7, 1954 W. P. ERICKS ET AL 2,696,449
METHOD AND APPARATUS FOR SPRAY COATING OF SURFACES
Filed Nov. 24, 1953 4 Sheets-Sheet 1

INVENTOR.
WALTER P. ERICKS
AND RICHARD A. BUTCHER
BY
THEIR ATTORNEY

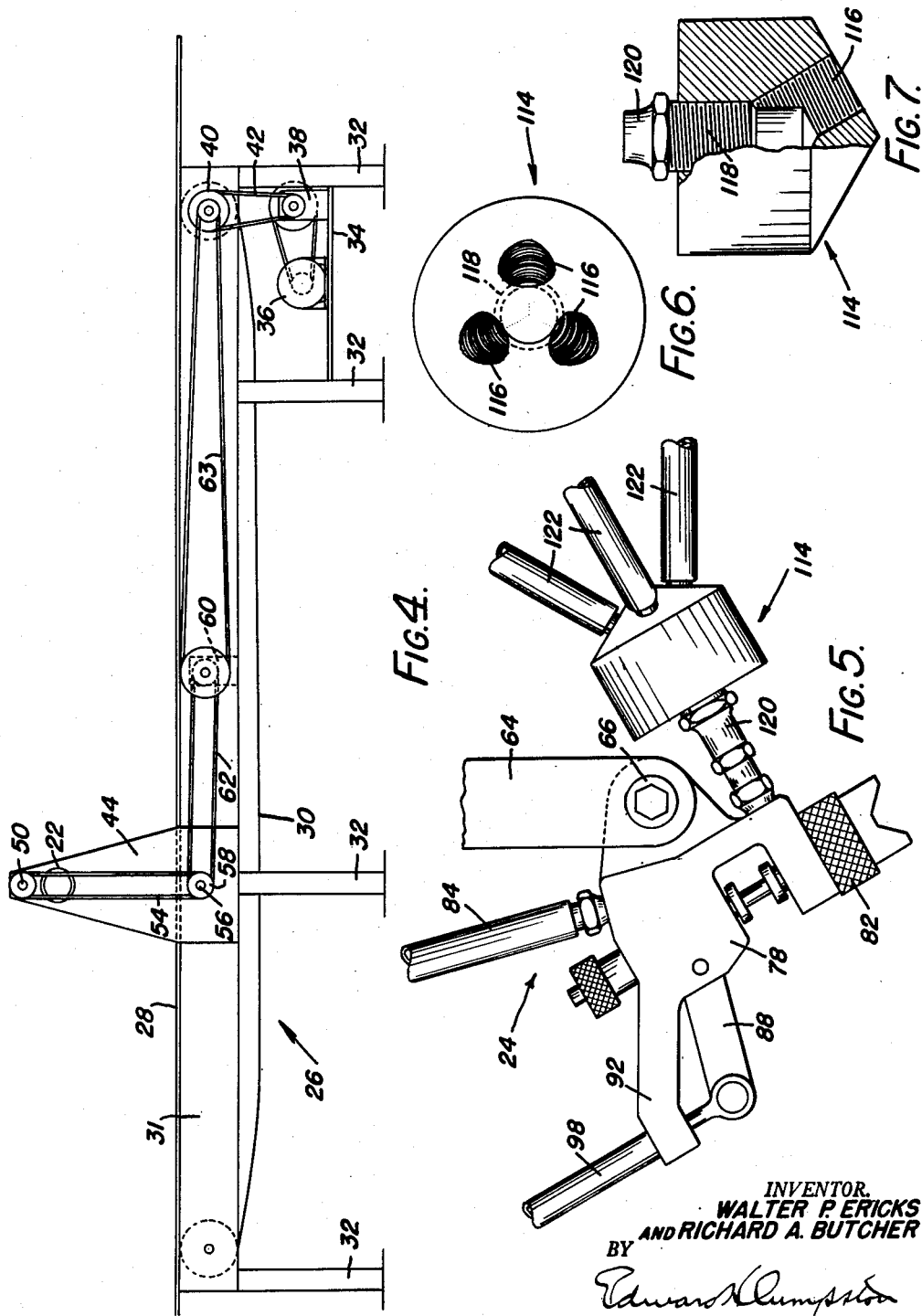

Dec. 7, 1954  W. P. ERICKS ET AL  2,696,449
METHOD AND APPARATUS FOR SPRAY COATING OF SURFACES
Filed Nov. 24, 1953  4 Sheets-Sheet 4

INVENTOR.
WALTER P. ERICKS
AND RICHARD A. BUTCHER
BY
THEIR ATTORNEY

United States Patent Office 2,696,449
Patented Dec. 7, 1954

2,696,449

METHOD AND APPARATUS FOR SPRAY COATING OF SURFACES

Walter P. Ericks and Richard A. Butcher, Lockport, N. Y., assignors to The Upson Company, Lockport, N. Y., a corporation of New York Application November 24, 1953, Serial No. 394,076

17 Claims. (Cl. 117—104)

This invention relates to the spray application of a coating substance on a surface, and more particularly to the methods and apparatus for accomplishing the same, one object of the invention being to provide an improved method and apparatus of a more simple, practical and efficient nature.

It has been common practice when spraying with a coating composition of a quick-drying nature, and particularly those which dry or set hard merely by the evaporation of the volatile solvents therein, such as nitro cellulose, polyvinyl chloride, and polystyrene, and the like, to frequently interrupt the spraying operation so that the guns can be cleared of the accumulation of spraying composition which builds up around the nozzle and tends to clog or plug the same. With the trigger depressed and the guns operating, the common method of clearing the spray guns is to momentarily release and again depress the trigger apparatus. This procedure is repeated several times, if necessary. As most spray guns are so constructed that the atomizing air line opens first and closes last during the depression and release of the trigger, respectively, this procedure allows short bursts of atomizing air to pass through the mixing nozzle and remove the accumulation of coating substance which had built up therein. This repeated actuation of the trigger to produce intermittent bursts of atomizing air and coating substance is called triggering and must be done frequently with both the internal and external-mixing types of spray guns in order to keep the same from becoming clogged.

However, this triggering operation has two decided disadvantages. First, the useful spraying operation had to be interrupted and the spraying apparatus directed away from the surface being coated so that the accumulated coating substance formed on the nozzle could be blown off in such a direction that it would not strike the surface being coated and cause an unevenness in the coating layer thereon. This reduced the effective spraying time and, consequently, decreased the speed of operation of the apparatus. In addition, this triggering method of cleaning the guns wasted that part of the coating composition which built up in the nozzle and also that which passed through the nozzle along with the bursts of atomizing air during the triggering operation.

For example, in this prior method of spray coating large objects such as sections of structural board, wallboard and the like, the objects to be coated are moved along a conveyor and a spray apparatus is mounted over the conveyor so as to direct a spray of coating substance on the objects as they pass therebeneath. The spraying apparatus usually comprises one to four spray guns mounted on a carriage which reciprocates across the conveyor in a direction transverse to the movement of the structural board along the conveyor. The triggers of the guns are held in operating position as the guns move from one side across the board and back to the starting point, after which the guns are moved beyond the edge of the structural board where they are triggered to clean the same. As each spray gun requires separate flexible connections for supplying both atomizing air and coating composition thereto, the apparatus is large and cumbersome. The flopping of the air and paint line connections not only results in an undue wearing of the same, but also limits the number of guns that can be mounted on the apparatus. As a result, only a few guns can be satisfactorily mounted on any one spraying apparatus and, consequently, the rate with which the coating is applied is necessarily slow.

Another object, therefore, is to provide an improved method of spray coating in which the spraying operation may be continued as long as desired without interrupting the same to clear the spray guns.

Another object is to provide an improved method of spray coating in which the spraying apparatus may remain stationary and the objects to be coated are moved relative thereto.

Another object is to provide an improved method of spray coating a material which produces a uniform and even pattern without wasting any of the coating substance during the triggering operations.

Another object is to provide an improved method of spraying a coating having the above advantages and being capable of a more rapid and efficient application of the coating substance.

Another object is to provide an improved apparatus for carrying out the above method, having a more simple, convenient and satisfactory type of construction.

Another object is to provide an apparatus having the above advantages in which a large number of separate spray guns may be mounted in closely spaced position for effectively increasing the rate of application of the coating material.

Another object is to provide an improved apparatus of the above nature which does not require any mechanism for moving the guns relative to the object to be coated, but in which each spray gun may be stationarily mounted and may be connected to suitable sources of both atomizing air and coating substance by connections which may remain stationary during operation.

A further object is to provide a spray apparatus having the above advantages in which each gun may be readily adjusted relative to the object being coated as well as relative to the adjacent guns positioned both transversely and longitudinally therefrom to produce a uniform coating of desired thickness.

Still a further object is to provide a spraying apparatus of the above nature which comprises but a few parts which may be readily and economically manufactured and assembled.

To these and other ends the invention resides in certain improvements and combinations of parts and method steps, all as will be hereinafter more fully described, the novel features being pointed out in the claims at the end of the specification.

Fig. 4 is a reduced side elevation showing the spraying unit of Figs. 1 and 3 mounted in position over a conveyor mechanism;

Fig. 5 is an enlarged fragmentary side elevation of a spray gun shown in Figs. 1 and 3, but having an adaptor for connection to three separate sources of coating substance;

Fig. 6 is a top plan view of the multiple adaptor shown in Fig. 5 removed for the purpose of clarity;

Fig. 7 is a side elevation, partly in section, of the multiple connector shown in Fig. 6;

Figure 1:
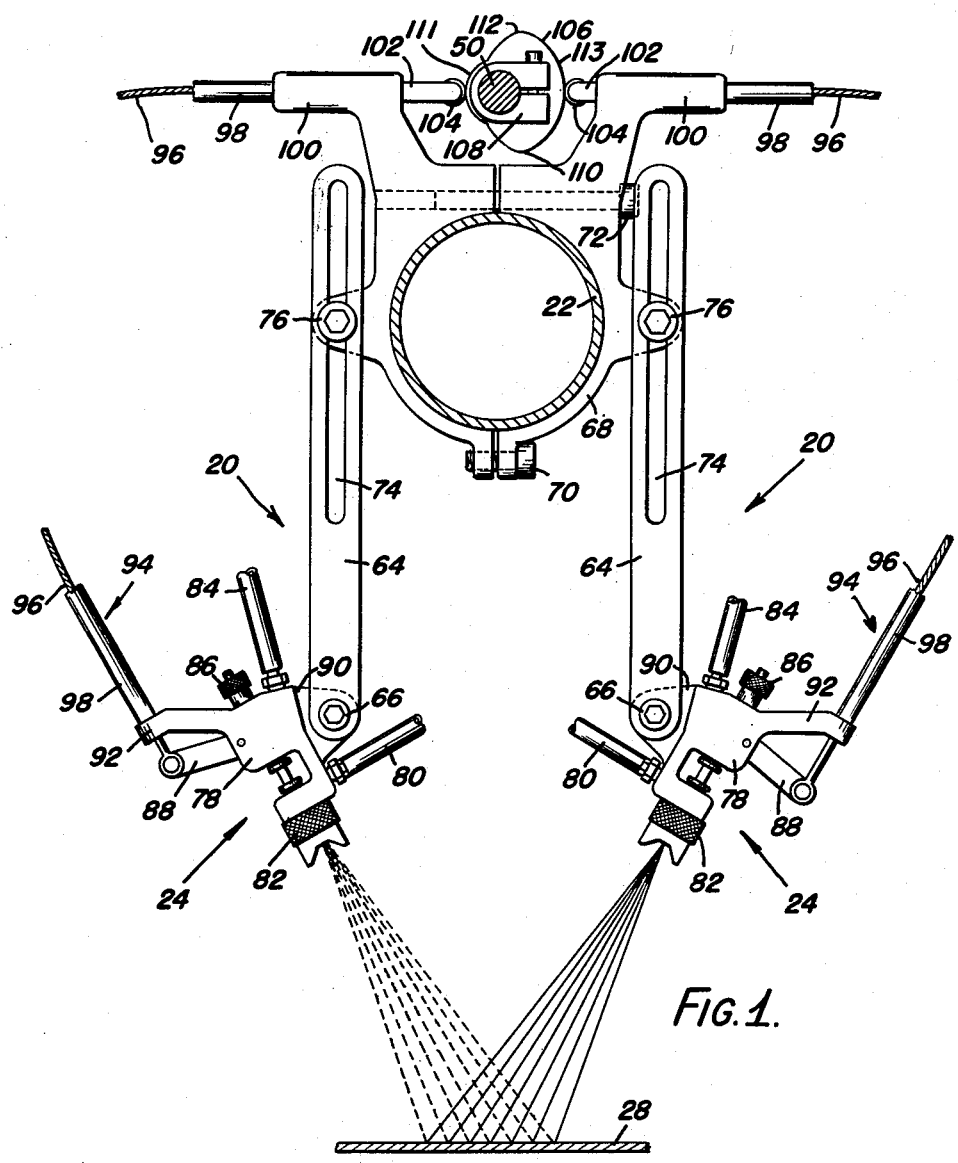
Fig. 1 is a side elevation of a spraying unit embodying the present invention showing the same in operating position.

In a preferred manner of carrying out the present method, herein disclosed by way of illustration, a spraying unit, shown generally at 20 (Fig. 1), is adjustably mounted on a suitable supporting member such as pipe member 22 and comprises a pair of spaced air-operated spray guns, shown generally at 24. Guns 24 are rapidly and alternately triggered to maintain a continuously impinging spray of coating substance and are mounted to spray substantially at a common area, as hereafter described in more detail.

Specifically, we have found that it is not necessary to frequently interrupt the spraying operation and direct the guns away from the object or material being coated to trigger the same for removing the accumulated coating substance built up in the gun nozzles. Thus, our guns are fixed in position and will satisfactorily spray-coat a substance onto a surface moved therebeneath by a conveyor or other suitable means. We have found that a build-up of coating substances on the gun nozzles can be prevented and the guns kept clean by frequent and rapid triggering of the same while in spraying position. Consequently, we arrange the guns in pairs forming a spray unit and provide means, hereafter more fully described, to rapidly and alternately operate the trigger of each gun of said pair of guns, respectively, in alternately timed relation to intermittently and rapidly initiate spraying operation of each of the guns for repeatedly clearing the same of accumulated coating substance, while maintaining a continuously impinging spray of said substance on the object being coated. Specifically, we provide means for rapidly and repeatedly turning "on" and "off" each gun in each spraying unit, but in such a manner that just prior to turning "off" one gun, the other gun is turned "on" so that there is a continuously impinging spray of coating substance from either one gun or the other to provide a uniform coating. Further details of the method are best understood in connection with a disclosure of the construction of our mechanical, electric and pneumatic means for rapidly triggering each of said guns in each spraying unit, as hereafter more fully described.

Although the work to be coated may be held stationary and a number of my spraying units moved therealong, we have found that it is much simpler to stationarily mount the spraying units and move the objects to be coated therebeneath by suitable means such as a conveyor. Consequently, our spraying unit is shown stationarily mounted above a conveyor, shown generally at 26 in Fig. 4, by which the objects or material 28 to be coated are moved. Conveyor 26 preferably comprises an endless belt 30 mounted on a suitable metal frame 31 which is supported by spaced legs 32. A horizontally extending platform 34 is located adjacent the right end of the conveyor and supports an electrical motor 36 which preferably drives a variable speed reducer 38. Speed reducer 38 in turn drives the right hand conveyor sprocket 40 by means of a chain 42. Speed reducer 38 allows the conveyor speed to be varied between 25 and 200 feet per minute.

Figure 3:
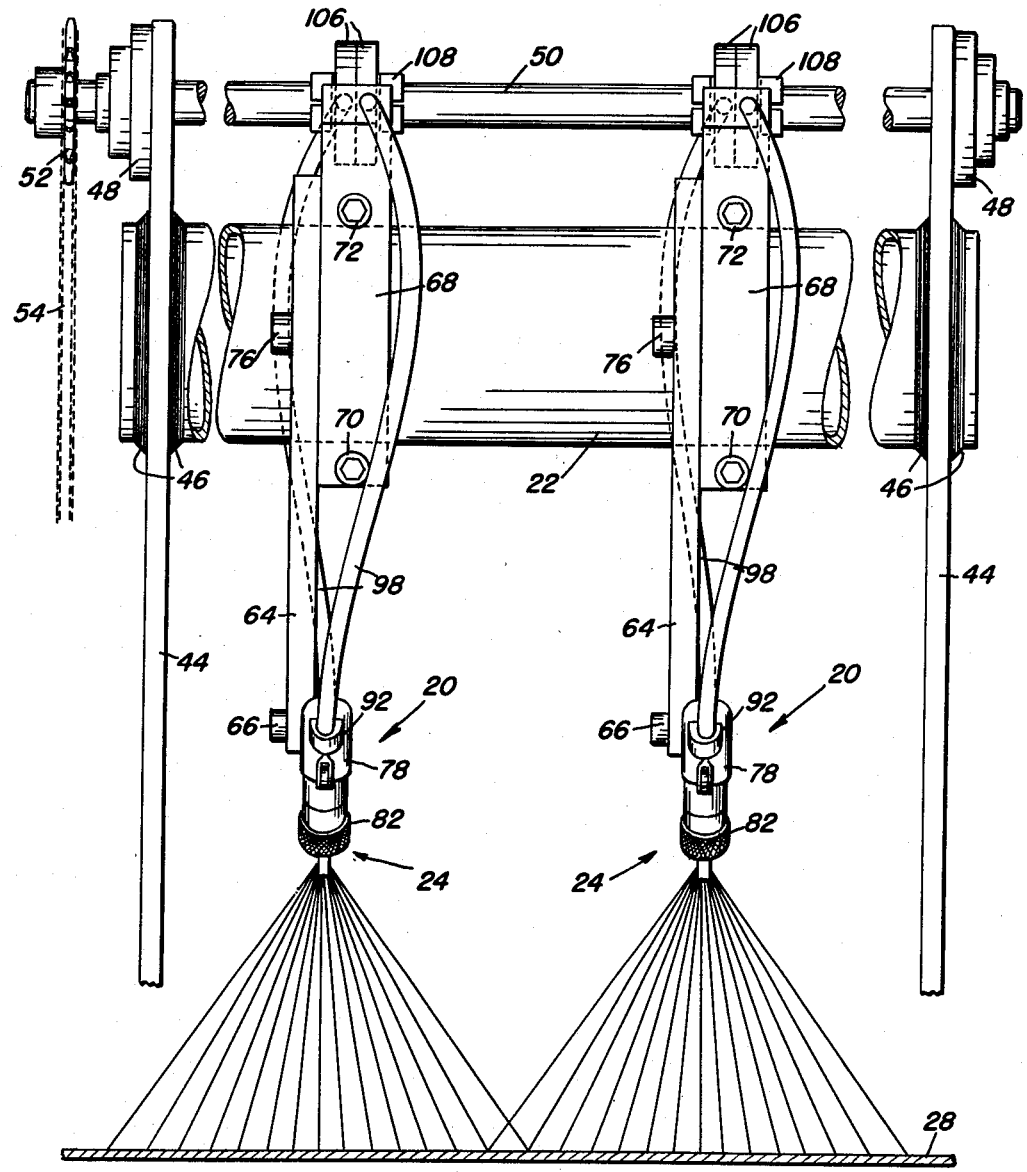
Fig. 3 is a side elevation showing a pair of spraying units mounted in adjusted position relative to one another.

The means for supporting my spraying units above the upper surface of conveyor 26 preferably comprises a pair of spaced bracket plates 44 (Figs. 3 and 4) which are mounted on opposite sides of conveyor frame 28. Pipe 22 is preferably fastened to brackets 44 by welding 46 (Fig. 3) or other suitable means. Brackets 44 extend upwardly beyond the openings formed therein for the reception of pipe 22 and are provided adjacent the upper end thereof with suitable bearings 48 (Fig. 3) for rotatably supporting a cam shaft 50 which extends parallel to, but spaced above pipe 22, as shown in Fig. 3. Shaft 50 is provided adjacent the left end thereof with a suitable sprocket 52. A chain 54 connects sprocket 52 with a suitable sprocket (not shown) on a short transversely extending jack shaft 56 (Fig. 4). A sprocket 58, mounted on shaft 56, is connected to a variable speed reducer 60 by means of a chain 62 (Fig. 4). Speed reducer 60 is in turn connected with the right hand conveyor shaft by a chain 63. Thus, motor 36 powers both the conveyor belt and cam shaft 52, but the cam shaft has its own speed control and may be readily varied without affecting the speed of the conveyor. Cam shaft 50 actuates the means for triggering guns 24 in alternately timed relation, as hereafter more fully described.

Referring to Fig. 1, guns 24 are preferably mounted on the lower ends of a pair of depending supporting arms or brackets 64 by means of suitable bolts 66. Bolts 66 may be loosened to allow guns 24 to be pivotally adjusted relative to arms 64 after which they are retightened to hold the guns in the desired positions. Arms 64 are in turn releasably clamped in the desired positions on a split bracket 68 which is held in adjusted position on pipe support 22 by means of transversely extending bolts 70 and 72, as shown in Fig. 1. To this end, arms 64 are provided adjacent the upper ends thereof with a pair of longitudinally extending slots 74 through which extend a pair of clamping bolts 76. Thus, guns 24 may be raised or lowered and swung toward or away from each other by loosening bolts 76 and swinging supporting arms 64 to the desired positions, after which bolts 76 are retightened to clamp arms 64 and guns 24 in the desired positions. As a result, guns 24 may be readily positioned to project a spray coating of the desired thickness and uniformity to any common point in the path of the structural board or other object moving thereunder.

Guns 24 are essentially of conventional and known construction, but have minor modifications therein as hereafter pointed out. Guns 24 each comprises a body portion 78, an inlet 80 for connection to the source of coating substance, as for example, paint or the like, a mixing nozzle 82, an inlet 84 for connection to a source of high pressure atomizing air or other fluid, an adjusting screw 86 for regulating the spray pattern, and a trigger 88 for operating the valves (not shown) in both the atomizing air and coating substance lines within the guns. Mixing nozzle 82 comprises an air line plunger rod (not shown) mounted therein and a coating substance or paint plunger rod (not shown) mounted therein. Trigger 88 operates both plunger rods sequentially in such a manner that the air plunger rod is moved, first, allowing the air to flow by the paint nozzle to clear the same, after which further movement of the trigger opens the paint plunger rod and the point is atomized as it passes through the nozzle into the air stream. When trigger 88 is released, the paint valve closes first while the atomizing air valve remains open until the trigger has nearly returned to its normal "off" position, thereby allowing the atomizing air to blow all of the excess paint out of the gun.

Gun body 78 is preferably provided with a suitable mounting flange 90 and differs from the regular gun body in that it has a bearing or supporting arm extending outwardly adjacent trigger 88 for supporting the lower end of the mechanical linkage which operates trigger 88, as hereafter more fully described.

Figure 2:
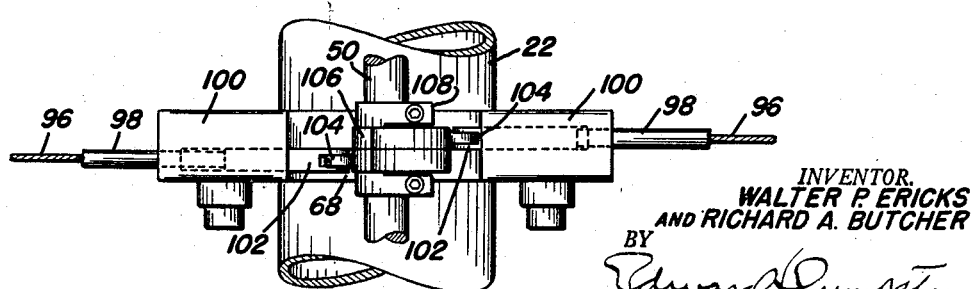
Fig. 2 is a fragmentary, top plan view of the spraying unit shown in Fig. 1.

The means for mechanically triggering guns 24 in alternately timed relation preferably comprises a pair of "push-pull" rods, shown generally at 94, which comprise an inner solid, relatively stiff wire or rod member 96 and an outer hollow sheath 98 through which rod 96 moves. Sheath 98 is fastened adjacent the lower end thereof to supporting arm 92 and adjacent the upper end thereof a supporting arm 100 which projects upwardly from the top of supporting bracket 68, as shown in Fig. 1. Inner rod 96 projects downwardly beyond the lower end of sheath 98 and is connected to trigger 88 of gun 24 while at the upper end thereof it is fitted with an enlarged head portion 102 slidably mounted in supporting arm 100 and carrying at the outer or free end thereof a cam following roller 104. As shown in Fig. 2, push rods 94 are spaced from one another along pipe 22 and are adapted to engage separate cam members 106 which are mounted on cam shaft 50 by a suitable clamp 108 (Fig. 1). Thus it will be seen that as cam shaft 50 rotates carrying cams 106 therewith, rods 96 are caused to reciprocate within their respective sheaths 98 and actuate triggers 88 of the respective guns 24.

As shown in Fig. 1, cams 106 are not merely eccentrics, but they preferably provide a long period of dwell for holding the guns in the "on" and "off" positions. To this end, the surface of cam 106 preferably comprises, in order, a lobe 110 of varying radius, a lower or depressed portion 111 having a uniform radius, a lobe 112 similar to lobe 110, and a lobe 113 having a uniform radius and connecting lobes 110 and 112. When cam follower rollers 104 are in engagement with either lobe 113 or depressed portion 111, they are not moved by rotation of the cams and the corresponding spray gun is held in its "on" or "off" position, respectively. That is, when cams 106 are in their positions shown in Figs. 1 and 2, trigger 88 of the right hand gun is held downwardly in its "on" position, while trigger 88 of the left hand gun has been allowed to move upwardly by spring means (not shown) to its "off" position. The guns will remain in the above positions until either lobe 110 or 112, depending on the direction of rotation of cam shaft 50, engages cam follower roller 104 of the left hand push rod and moves the same to the left turning "on" the left hand spray gun 24. Further rotation of cams 106 allows the right hand cam follower roller 104 to move off raised portion 113, along either lobe 110 or 112 and onto depressed portion 111 of the respective cam 106, thereby allowing trigger 88 of the right hand gun to move upwardly to its "off" position by spring means (not shown). Lobes 110 and 112 are preferably formed to impart equal lateral motion to the push rods for each degree of rotation of cam shaft 50, thereby imparting a uniform motion to the push rods. Portions 111 and 113 which are of constant radius, impart no motion to the push rods, but merely provide extended periods of dwell for holding the guns "on" and "off." Cam shaft 50 and cam 106 may be driven at any desired speed so as to rapidly trigger each gun, as for example, several times a second, for repeatedly clearing the same of accumulated coating substance. As the guns overlap in their "on" position, a continuously impinging spray of coating substance is maintained not withstanding the repeated triggering, so that a uniform coating is applied.

Guns 24 may be adjusted in elevation relative to the top of the conveyor and may be inclined at the desired angle relative to one another so as to produce, by their alternating operation, a continuously and uniformly applied zone of coating of the desired thickness along the wall board or other material on the conveyor. As the guns produce a pattern having a limited width, it is desirable when coating large objects such as sheets of structural board and the like, to arrange a number of spraying units 20 in spaced relation transversely along pipe member 22, as shown in Fig. 3. Each unit may be positioned relative to the adjacent unit so as to produce the desired overlapping of patterns and provide a uniform coating for the entire width of the structural board.

As a result of our construction, it is now possible to feed the board at increased linear speed up to 200 feet a minute, whereas in the past the maximum speed has been about 25 feet per minute. In addition, the spraying units may be moved relative to one another or the individual guns may be adjustably moved in each spray unit without disturbing the triggering frequency of the guns relative to the conveyor speed. However, both the conveyor speed and triggering frequency may be independently varied to best suit the particular job.

In Figs. 1 and 3 we have shown the spray guns connected to a single source of coating substance, but we have also devised a multiple inlet adaptor, shown generally at 114 (Figs. 5, 6 and 7). Adaptor 114 is provided with three inwardly extending, converging, threaded inlet bores 116 which intersect one another and a threaded outlet 118, as shown in Fig. 7. Outlet 118 is connected to body 78 of gun 24 by means of a suitable threaded connecting nipple 120, as shown in Fig. 5. Up to three separate sources of coating substance, such as paint and the like, may be connected to connector head 114 by suitable pipe or hose lines 122 (Fig. 5). As a result, each gun 24 can spray up to three different substances at the same time, which, if the coating substances are paints of different colors, will produce an attractive mottled pattern on the object being sprayed.

Figure 8:
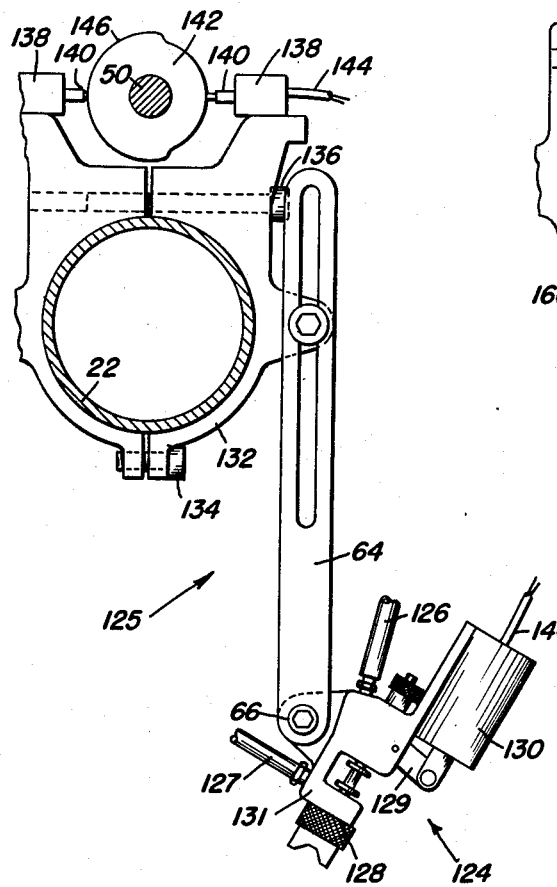
Fig. 8 is a fragmentary side elevation showing a modified spray unit arranged to be operated electrically.

The individual spray guns in each unit may also be triggered by electrical rather than mechanical means. In Fig. 8 there is shown generally at 124, one gun of an electrically triggered spray unit (shown generally at 125) and the electrical means for triggering the same. Gun 124 has an atomizing air inlet 126, an inlet 127 for the coating substance, a mixing nozzle 128 and is otherwise similar to gun 24 except that the trigger 129 is actuated by a solenoid 130 of known construction which is mounted on gun body 131 rearwardly of trigger 129. Gun 124 is pivotally mounted in the lower end of the supporting arm or bracket 64 in the same manner as gun 24, as described above. Arm 64 is pivotally and slidably mounted on a split bracket 132 which is releasably clamped in engagement with pipe support 22 by means of a pair of transversely extending bolts 134 and 136. Thus, guns 124 may be readily adjusted relative to one another and relative to the object being coated in the same manner as guns 24.

Referring more particularly to the electrical means for triggering guns 124, it will be seen that bracket 132 has a pair of electrical switches 138 mounted adjacent the upper end thereof in spaced relation and on opposite sides of cam shaft 50. Switches 138 have a pair of inwardly extending plunger arms 140 which are positioned to be engaged by a pair of cams 142 mounted on cam shaft 50 in place of cams 112 shown in Fig. 1. Switches 138 are connected by suitable wires 144 in series with solenoids 130 and a source of electrical energy (not shown) whereby the circuit to each solenoid 130 is closed only when the respective switch 138 is closed. The closing of switch 138 and the energizing of solenoid 130 moves trigger 129 to its rearward position, opening first the atomizing air line and then the valve in the coating substance line to produce a finely atomizing spray of coating material. It will be noted that cams 142 are each formed with a raised land or lobe 146 which engages and depresses the actuating plunger 140 of each switch 138. It will be seen in Fig. 8 that land 146 has closed the left hand switch 138 and thereby turned on the left hand gun 124 (not shown). Land 146 is of sufficient extent so that it will engage plunger 140 of the right hand switch 138, thereby actuating the right hand gun 124 just prior to the time that the left hand switch is opened. This results in an overlapping of the spraying operation and produces a continuously impinging spray of coating material as previously described.

Figure 9:
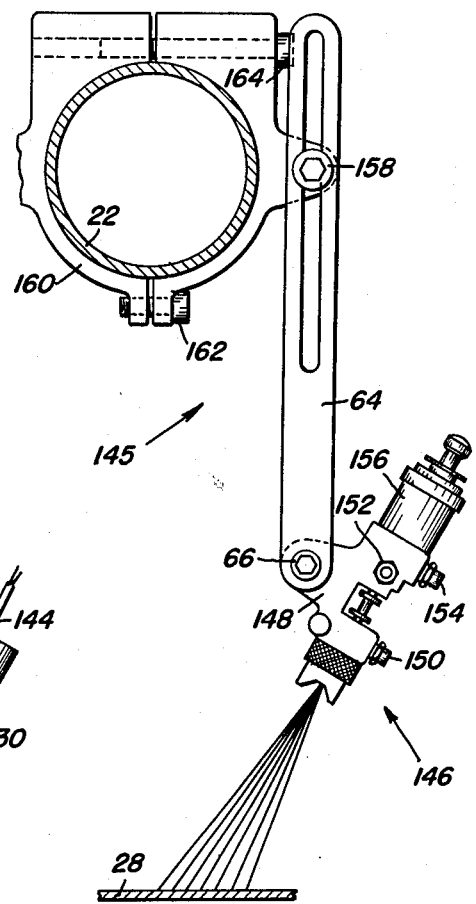
Fig. 9 is a fragmentary side elevation showing still another modification of the spray unit arranged to be operated pneumatically.

Our invention also comprises the triggering of the guns of one or more air spray units, shown generally at 145, by pneumatic means, and to this end, Fig. 9 shows one gun 146 of a pair of such spray guns pivotally mounted on the lower end of supporting arm 64. Guns 146 are similar to guns 124 and 24 in that they each comprise a body section 148 having an inlet 150 for the coating substance, and a second inlet 152 for the atomizing air. However, guns 146 also have a third inlet 154 for the actuating air. Inlet 154 is connected to a piston cylinder mechanism 156 which is so arranged that when high pressure air flows through inlet 154, it moves the piston (not shown) upwardly against the tension of a spring (not shown) and opens the trigger of gun 148 so as to first withdraw the plunger from the air orifice opening the atomizing air line leading from inlet 152, after which it opens the coating substance passageway leading from inlet 150 to provide an atomizing spray of coating substance. To release the trigger and close the air and coating substance lines, inlet 154 is connected or exhausted to the atmosphere, thereby allowing the piston to return to its normal position under the action of the above spring.

Supporting arm 64 is pivotally and slidably mounted by a bolt 158 on a split bracket 160 which in turn is releasably held in adjusted position on pipe support 22 by transversely extending bolts 162 and 164. Thus, guns 146 may be raised and lowered and moved toward and away from each other and each individual spray unit 145 may be moved relative to the adjacent spray unit to produce a continuous, uniform coating of the desired thickness on the object or material being sprayed. Bracket 160 is similar to bracket 68 except that it does not have the upwardly extending supports thereon, for although the valves controlling the actuating air line might be mounted above supporting pipe 22, such is not necessary, and we prefer to mount the air valve mechanism, hereafter described, either at a convenient location below conveyor 26 or at some remote position.

Figure 10:
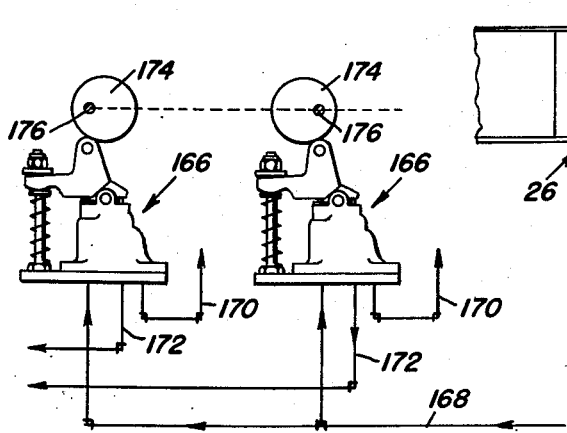
Fig. 10 is a schematic view showing the air line connections to the spraying unit shown in Fig. 9.
Figure 11:
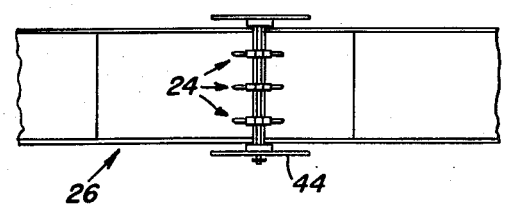
Fig. 11 is a top plan view of the conveyor of Fig. 4 showing three of the spraying units of Figs. 1 and 3 mounted thereon.

The means for connecting inlet 154 of each gun 146 alternately with a source of high pressure air or exhausting the same to the atmosphere, preferably comprises a three-way valve mechanism, shown generally at 166 (Fig. 10), which has a suitable connection with a source of high pressure air 168, a second connection 170 for exhaustion with the atmosphere and a third connection 172 which leads to inlet 154 of gun 146. Each gun 146 of each spray unit 145 is provided with a separate valve 166, in the present instance two of such valves being shown for operation of the spraying unit, partially shown in Fig. 9. Valves 166 are preferably operated by means of a pair of cams 174 mounted on a suitable cam shaft 176 which is driven in timed relation with the conveyor. Cam shaft 176 has a wide range of speeds and may be independently driven or it may be driven by variable speed reducer 60 by means of suitable belt or chain means, not shown, and will thus have the same range of speeds relative to the conveyor as does cam shaft 52 in the embodiment shown in Fig. 4. This may be easily done if valves 166 are mounted on a suitable support or table (not shown) beneath conveyor 26.

Cams 174 are preferably of such configuration and are so positioned on shaft 176 that there will be a slight overlapping in operation of the guns in that one gun is turned "on" just before the other gun is turned "off" for triggering. Thus, guns 146 function in the same manner as guns 24 and 124 and produce a continuously impinging spray of coating material on the object to be coated.

Thus, it will be seen that the invention accomplishes its objects and regardless of whether the spray guns are mechanically, electrically or pneumatically triggered, the method of operation thereof is the same in that two guns are arranged in spaced relationship and are so controlled as to maintain a continuously impinging spray of coating material while each of the guns is being rapidly and repeatedly triggered to clear the same of coating substance which tends to accumulate in the nozzle thereof. This means that our spray units may be operated continuously without interruption, may be stationarily mounted, and will satisfactorily coat a continuous flow of material relative thereto. Our guns produce a uniform and even pattern which may be readily adjusted as to thickness. Our invention allows a large number of spray units to be mounted in closely spaced position on a single support so that large objects may be coated for the full width thereof. Moreover, one or more of the guns in our spraying units may be connected to one, two or three different sources of coating material. When used with paints, this allows the application of up to three different colors of paint at the same time, thereby producing a uniform mottled pattern which is highly desirous in certain operations.

As a result of our invention, it is now possible to apply spray coating to objects moving at a linear speed of up to 200 feet per minute, whereas in the past large objects have been limited to a linear speed of about 25 feet per minute. In addition, our spraying apparatus is much simpler and less expensive than heretofore used in that the guns may be stationarily mounted and there is no need for expensive and complicated mechanism to reciprocate the guns across the work and trigger the same at the end of the stroke. As our guns are rapidly and repeatedly triggered, there is no opportunity for the coating substance to build up in the nozzle and, consequently, there is no globular discharge of material during the triggering, nor is there any tendency for the guns to become partially plugged, thereby decreasing their effective output, as has been the case in the past. Thus, repeated and rapid triggering of the guns not only keeps the same clear of accumulated coating material, but it insures a uniform coating. Due to the compactness of each spray unit comprising but two guns which may be triggered by remote means, it is now possible to assemble a large number of spraying units in such close relationship that the desired overlapping may be obtained between the coatings of each two adjacent spray units.

Our spray apparatus has the further advantage that it is particularly well adapted for use under explosive or otherwise hazardous conditions. That is, when the guns are electrically or pneumatically triggered, the triggering mechanism, including the variable speed cam shaft and cams mounted thereon, may be located in any desired position remote from the spray guns so as to eliminate a possible source of sparks which might touch off an explosion or fire. The remotely positioned triggering mechanism may be readily connected to the spray apparatus by electrical wires or suitable air lines, as the case may be.

It will thus be seen that the invention accomplishes its objects and while it has been herein disclosed by reference to method steps of the particular nature preferred, it is understood that such disclosure is intended in an illustrative, rather than a limiting sense, as it is contemplated that various modifications in the details and order of such steps will readily occur to those skilled in the art, within the spirit of the invention and the scope of the appended claims.

We claim:

1. An apparatus for applying an air-spray coating of a substance to a material to be coated comprising means for moving said material in a path, a pair of air-spray guns each having trigger means for starting and stopping the spraying operation thereof, means supporting said guns in spaced relation to each other longitudinally of said path in positions for coincidentally spraying the same area of said material and means for intermittently operating said trigger means of said guns, respectively, in alternately timed relation to intermittently and repeatedly initiate spraying operation of each of said guns for repeatedly clearing the same of accumulated coating substance, while maintaining a continuously impinging spray of said substance on said material to uniformly coat the same.

2. An apparatus for applying an air-spray coating of a substance to a material to be coated comprising means for continuously moving said material in a path, a pair of air-spray guns each having trigger means for starting and stopping the spraying operation thereof, means supporting said guns in spaced relation to each other longitudinally of said path in positions for coincidentally spraying the same area of said material and means for intermittently operating said trigger means of said guns, respectively, in alternately timed relation to intermittently and repeatedly initiate spraying operation of each of said guns for repeatedly clearing the same of accumulated coating substance, while maintaining a continuously impinging spray of said substance on said material to uniformly coat the same.

3. An apparatus for applying an air-spray coating of a substance to a material to be coated comprising means for moving said material in a path, a pair of air-spray guns each having trigger means for starting and stopping the spraying operation thereof, means stationarily supporting said guns in spaced relation to each other longitudinally of said path in positions for coincidentally spraying the same area of said material and means for intermittently operating said trigger means of said guns, respectively, in alternately timed relation to intermittently and repeatedly initiate spraying operation of each of said guns for repeatedly clearing the same of accumulated coating substance, while maintaining a continuously impinging spray of said substance on said material to uniformly coat the same.

4. An apparatus for applying an air-spray coating of a substance to a material to be coated comprising means for continuously moving said material in a path, a pair of air-spray guns each having trigger means for starting and stopping the spraying operation thereof, means stationarily supporting said guns in spaced relation to each other longitudinally of said path in positions for coincidentally spraying the same area of said material and means for intermittently operating said trigger means of said guns, respectively, in alternately timed relation to intermittently and repeatedly initiate spraying operation of each of said guns for repeatedly clearing the same of accumulated coating substance, while maintaining a continuously impinging spray of said substance on said material to uniformly coat the same.

5. An apparatus for applying an air-spray coating of a substance to a material to be coated comprising means for moving said material in a path, a pair of air-spray guns each having trigger means for starting and stopping the spraying operation thereof, means supporting said guns in spaced relation to each other longitudinally of said path in positions for coincidentally spraying the same area of said material, and cam means for intermittently operating said trigger means of said guns, respectively, in alternately timed relation to intermittently and repeatedly initiate spraying operation of each of said guns for repeatedly clearing the same of accumulated coating substance, while maintaining a continuously impinging spray of said substance on said material to uniformly coat the same.

6. An apparatus for applying an air-spray coating of a substance to a material to be coated comprising means for continuously moving said material in a path, a pair of air-spray guns each having trigger means for starting and stopping the spraying operation thereof, means stationarily supporting said guns in spaced relation to each other longitudinally of said path for coincidentally spraying the same area of said material and cam means for intermittently operating the trigger means of said guns, respectively, in alternately timed relation to intermittently and repeatedly initiate spraying operation of each of said guns for repeatedly clearing the same of accumulated coating substance, while maintaining a continuously impinging spray of said substance on said material to uniformly coat the same.

7. An apparatus for applying an air-spray coating of a plurality of substances of different colors, respectively, to a material to be coated comprising means for moving said material in a path, a pair of air-spray guns each provided with means for simultaneously spraying a plurality of substances of different colors and each having trigger means for starting and stopping the spraying operation thereof, means supporting said guns in spaced relation to each other longitudinally of said path in positions for coincidentally spraying the same area of said material and means for intermittently operating said trigger means of said guns, respectively, in alternately timed relation to intermittently and repeatedly initiate spraying operation of each of said guns for repeatedly clearing the same of accumulated coating substances, while maintaining a continuously impinging spraying of said substances on said material to uniformly coat the same.

8. An apparatus for applying an air-spray coating of a substance to a material to be coated, comprising means for moving said material in a path, a plurality of pairs of air-spray guns each having trigger means for starting and stopping the spraying operation thereof, means supporting said pairs of guns in spaced relation with one another transversely of said path in positions for spraying transversely overlapping areas of said material, means supporting the guns of each of said pairs in spaced relation to each other longitudinally of said path in positions for coincidentally spraying the same area of said material, and means for intermittently operating the trigger means of the guns of each pair, respectively, in alternately timed relation to intermittently and repeatedly initiate spraying operation of each of said guns for repeatedly clearing the same of accumulated coating substance, while maintaining a continuously impinging spray of said substance on said material from each of said pairs of guns to uniformly coat the same.

9. The method of applying an air-spray coating of a substance to a material to be coated comprising the steps of moving said material in a path, directing air-spray streams of said substance coincidentally on said moving material from a pair of spray guns spaced from each other longitudinally of said path and operating each of said guns intermittently and alternately with the other of said guns, to intermittently and repeatedly initiate the operation of each gun to clear the same of an accumulation of said substance, while maintaining a continuously impinging spray of said substance on said material to uniformly coat the same.

10. The method of applying an air-spray coating of a substance to a material to be coated comprising the steps of continuously moving said material in a path, directing air-spray streams of said substance coincidentally on said moving material from a pair of spray guns spaced from each other longitudinally of said path and operating each of said guns intermittently and alternately with the other of said guns, to intermittently and repeatedly initiate the operation of each gun to clear the same of an accumulation of said substance, while maintaining a continuously impinging spray of said substance on said material to uniformly coat the same.

11. The method of applying an air-spray coating of a substance to a material to be coated comprising the steps of moving said material continuously in a path, directing air-spray streams of said substance coincidentally on said moving material from a pair of spray guns stationarily spaced from each other longitudinally of said path, and operating each of said guns intermittently and alternately with the other of said guns, to intermittently and repeatedly initiate the operation of each gun to clear the same of an accumulation of said substance, while maintaining a continuously impinging spray of said substance on said material to uniformly coat the same.

12. The method of applying an air-spray coating of a substance to a material to be coated comprising the steps of moving said material in a path, directing air-spray streams of said substance coincidentally on said moving material from a pair of spray guns spaced from each other longitudinally of said path and operating each of said guns intermittently in timed alternation with the other of said guns and at intervals occurring in relatively rapid succession, to intermittently and repeatedly initiate the operation of each gun to clear the same of an accumulation of said substance, while maintaining a continuously impinging spray of said substance on said material to uniformly coat the same.

13. The method of applying an air-spray coating of a substance to a material to be coated comprising the steps of moving said material in a path, directing air-spray streams of said substance on said moving material from a plurality of pairs of spray guns spaced from each other transversely of said path with the guns of each pair spaced from each other longitudinally of said path and positioned for coincidentally spraying the same area of said material in overlapping relation with adjacent areas sprayed by adjacent pairs of guns and operating each of the guns of each of said pairs intermittently and alternately with the other gun of each pair, to intermittently and repeatedly initiate the operation of each gun to clear the same of an accumulation of said substance, while maintaining continuously impinging sprays of said substance on said material to uniformly coat the same.

14. The method of applying an air-spray coating of a substance to a material to be coated comprising the steps of continuously moving said material in a path, directing air-spray streams of said substance on said moving material from a plurality of pairs of stationary spray guns spaced from each other transversely of said path with the guns of each pair spaced from each other longitudinally of said path and positioned for coincidentally spraying the same area of said material in overlapping relation with adjacent areas sprayed by adjacent pairs of guns, and operating each of the guns of each of said pairs intermittently and alternately with the other gun of each pair, to intermittently and repeatedly initiate the operation of each gun to clear the same of an accumulation of said substance, while maintaining continuously impinging sprays of said substance on said material to uniformly coat the same.

15. An apparatus for applying an air spray coating of a substance to a material to be coated comprising means for moving said material in a path, a pair of air spray guns each having trigger means for starting and stopping the spraying operation thereof, means supporting said guns in spaced relation to each other longitudinally of said path in position for coincidentally spraying the same area of said material, and means for intermittently operating said trigger means of said guns comprising a member connected to said trigger means of each gun, cam means actuating said members for intermittently operating said trigger means of said guns, respectively, in alternately timed relation to intermittently and repeatedly initiate spraying operation of each of said guns for repeatedly clearing the same of accumulated coating substance, while maintaining a continuously impinging spray of said substance on said material to uniformly coat the same.

16. An apparatus for applying an air spray coating of a substance to a material to be coated comprising means for moving said material in a path, a pair of air spray guns each having trigger means for starting and stopping the spraying operation thereof, means supporting said guns in spaced relation to each other longitudinally of said path in position for coincidentally spraying the same area of said material, and means for intermittently operating said trigger means comprising a fluid pressure system, means responsive to changes in fluid pressure for actuating said trigger means, valve means for changing the intensity of the fluid pressure on said trigger actuating means, and means actuating said valve means for intermittently operating said trigger actuating means of said guns, respectively, in alternately timed relation to intermittently and repeatedly initiate spraying operation of each of said guns for repeatedly clearing the same of accumulated coating substance, while maintaining a continuously impinging spray of said substance on said material to uniformly coat the same.

17. An apparatus for applying an air spray coating of a substance to a material to be coated comprising means for moving said material in a path, a pair of air spray guns each having trigger means for starting and stopping the spraying operation thereof, means supporting said guns in spaced relation to each other longitudinally of said path in position for coincidentally spraying the same area of said material, means for intermittently operating said trigger means comprising electrically operated means connected to said trigger means for actuating the same, an electrical circuit connecting said triggering actuating means to a source of electrical energy, switch means controlling said electrical circuit, and means actuating said switch means for intermittently operating said trigger means of said guns, respectively, in alternately timed relation to intermittently and repeatedly initiate spraying operation of each of said guns for repeatedly clearing the same of accumulated coating substance while maintaining a continuously impinging spray of said substance on said material to uniformly coat the same.

References Cited in the file of this patent

UNITED STATES PATENTS

| Number | Name | Date |
|---|---|---|
| 1,774,694 | Bateman | Sept. 20, 1930 |
| 2,368,829 | Harrington | Feb. 6, 1945 |
| 2,448,226 | Marsden | Aug. 31, 1948 |
| 2,513,081 | Clark et al. | June 27, 1950 |
| 2,532,187 | Paasche | Nov. 28, 1950 |
| 2,581,957 | Jones | Jan. 8, 1952 |
| 2,583,234 | Russell et al. | Jan. 22, 1952 |
| 2,674,490 | Richards | Apr. 6, 1954 |
| 2,677,626 | Bodle et al. | May 4, 1954 |

FOREIGN PATENTS

| Number | Country | Date |
|---|---|---|
| 8,703 | Great Britain | Apr. 16, 1903 |